United States Patent [19]
Georgopoulos et al.

[11] Patent Number: 5,347,689
[45] Date of Patent: Sep. 20, 1994

[54] REUSABLE BOLT SEAL

[75] Inventors: George Georgopoulos, Pine Brooks; Richard C. Dreisbach, North Arlington, both of N.J.

[73] Assignee: E. J. Brooks Company, Newark, N.J.

[21] Appl. No.: 73,529

[22] Filed: Jun. 8, 1993

[51] Int. Cl.$^5$ .............................. F16G 11/00
[52] U.S. Cl. .................. 24/136 R; 24/115 M; 24/652; 403/369
[58] Field of Search ............ 24/136 R, 136 A, 136 L, 24/115 M, 652, 701; 403/369, 374

[56] References Cited

U.S. PATENT DOCUMENTS

| | | |
|---|---|---|
| 889,776 | 6/1908 | Dyer . |
| 1,577,678 | 4/1925 | Behrman . |
| 2,538,043 | 1/1951 | Roy et al. ............ 24/136 R |
| 3,374,511 | 3/1968 | Barker ................ 403/369 |
| 3,524,228 | 8/1970 | Kelly ................. 403/369 |
| 3,852,850 | 12/1974 | Filhaber . |
| 3,868,748 | 3/1975 | Kelly . |
| 3,952,377 | 4/1976 | Morell ................ 403/374 |
| 3,994,521 | 11/1976 | Van Gompel . |

OTHER PUBLICATIONS

Brooks Catalog 89014 No date is given, one sheet.

*Primary Examiner*—Victor N. Sakran
*Attorney, Agent, or Firm*—William Squire

[57] ABSTRACT

A self locking rod seal includes a plurality of stamped sheet metal tapered frustro-conical segments which mate in a tapered frustro-conical bore of a steel housing. The segments are identical and include a projection upstanding from a recess in each of two opposing shoulders. The projections are received in the recess formed in an opposing shoulder of the other segment. The recesses receive the projections of the different segments in interengaging relation so that axial displacement of one segment requires axial displacement of the other segment. A spring urges the segments against the tapered bore of the housing. The segments in one embodiment have cantilevered radially resilient fingers which grip a rod in the bore thereof when the rod is slid in one direction and which release the rod when the rod is slid in the opposite direction. The rod has a flag at one end which with the seal lock a hasp therebetween.

13 Claims, 2 Drawing Sheets

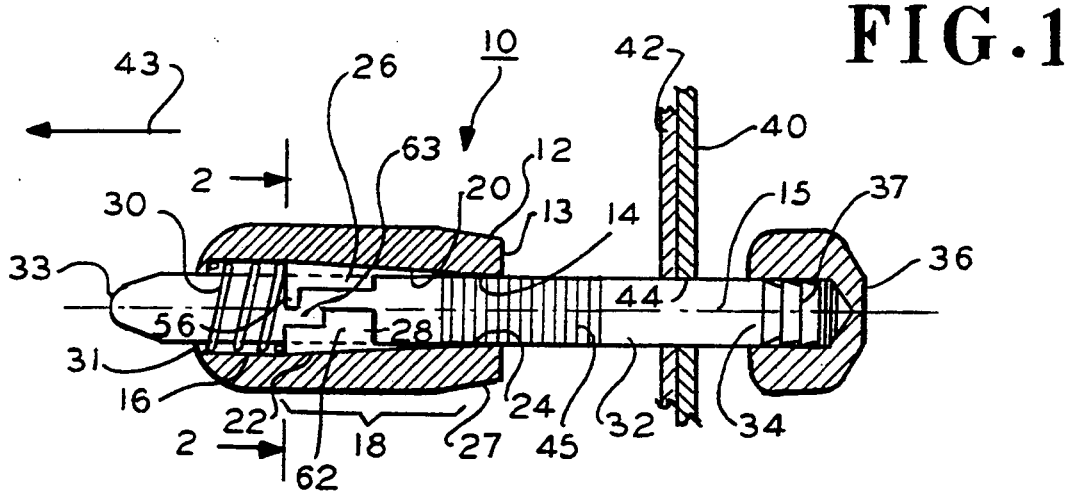
FIG. 1
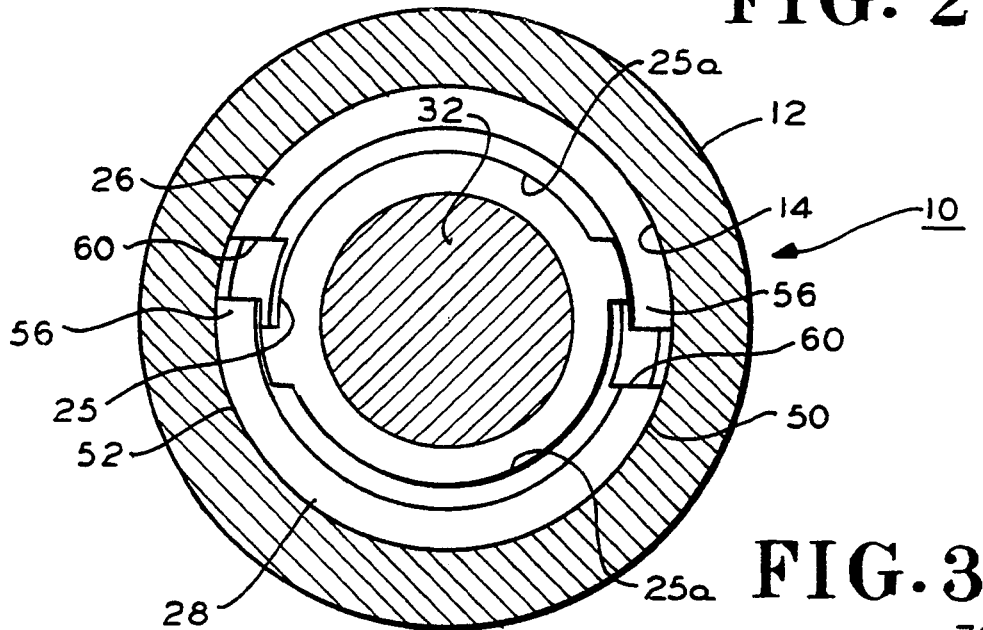
FIG. 2
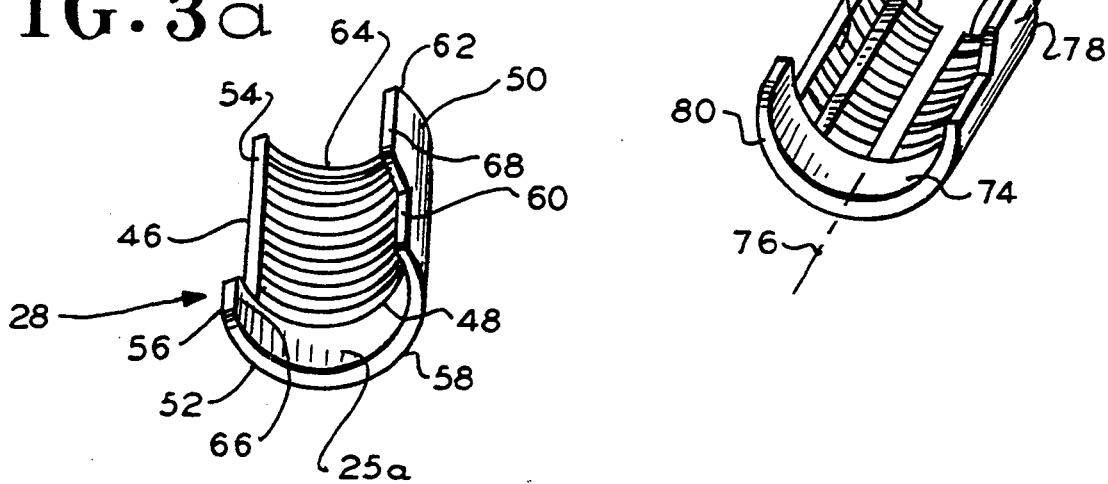
FIG. 3a
FIG. 3b

REUSABLE BOLT SEAL

FIELD OF INVENTION

This invention relates to reusable cable seals for locking a cable or bolt rod thereto.

CROSS REFERENCE TO RELATED APPLICATIONS

Of interest is commonly owned copending application Ser. No. 08,065,471 filed May 21, 1993 entitled Cable Seal in the name of the present inventors.

BACKGROUND OF THE INVENTION

Cable seals are in wide use and comprise a self-adjusting cable gripping unit which automatically adapts itself to gripping a stranded cable. In such use, a cable is typically formed with a swaged flag at one end to form an integral head member for the cable end. The other end of the cable is free. The cable free end is slipped or otherwise passed through an opening of a structure to be locked, for example, two hasps of a lock arrangement or other arrangement in doors, walls and the like for securing two elements together.

After the cable is slipped through the hasps or other lock arrangement, the cable gripping unit receives the free end of the cable and the cable is slid through the unit which has a bore therein including a cable gripping structure comprising segments within the bore which spread apart and slide over the cable as the unit is slid along the cable. When the unit reaches a desirable position adjacent to the hasp or other structure to which the cable is to be locked the unit is left in place at that location. Any attempt to remove the unit by sliding the unit in a reverse direction along the cable is precluded by the gripping structure within the unit bore. If the gripping structure is attempted to be displaced in the reverse direction by displacing the cable, the cable is gripped by the gripping structure as the cable is displaced and the gripping structure wedges against the cable and unit housing locking the cable thereto. The gripping unit housing and the flag at opposing ends of the cable lock the cable and the hasp together.

In U.S. Pat. No. 3,852,850 for example, a cable gripping unit is disclosed. This unit includes a helical spring, a cable receiving cup and a gripping member comprising a jaw retaining member and jaw segments. A shell formed of metal has a bore terminating in a cable accommodating opening and a cylindrical portion terminating in a reduced diameter opening providing an inwardly projecting annular shoulder. The gripping member and jaw segments are received in the bore. The gripping member is urged toward a reduced end of the opening of the gripping unit shell. The jaw retaining member is formed of an elastic material with the jaw segments held in slots in the retaining member. A spring urges the jaw segments in wedging engagement in the shell bore. This structure requires a number of different elements including separate jaw segments and a jaw retaining member. A problem with this structure as recognized by the present inventors is the need for the additional jaw retaining member. Additional structure adds cost.

U.S. Pat. No. 3,868,748 ('748) discloses a tendon gripping and release assembly somewhat similar to that disclosed in U.S. Pat. No. 3,852,850. In the '748 patent, a tapering casing housing includes spring compressed wedge segments arranged to form a bore therebetween for reception and retention of a steel tendon inserted in the casing. The wedged segments are urged towards the small end of the tapering casing by a spring. An elongated release member extends transversely through the small end of the tapered casing and engages one end of the wedge segments. The release member urges the wedged segments rearwardly against the tension of a spring to release the grip on the tendon and permit removal thereof from the assembly. This structure may have the same problem addressed above.

In those instances where it is not desirable to release the tendon, the use of a release mechanism as disclosed in this patent is not desirable. For example, where it is desired to permanently lock a hasp or other structure together, a release mechanism is not needed.

In U.S. Pat. No. 3,994,521, a portable cable lock is employed with a ball detent mechanism. The balls provide similar action as that of the wedge segments in the patents discussed above. In this arrangement, a locking shell is formed with a central passageway which is internally tapered with an opening that changes from conical to triangular and which carries spring loaded ball bearings and a retainer such that a cable can be inserted through the central opening in a first direction. This depresses the spring and allows the balls to relieve pressure on the cable in the first direction but which provide substantial locking pressure on the cable when the cable is placed under tension in the opposite direction. A still further arrangement is disclosed in U.S. Pat. No. 1,577,678 which discloses a fastening means employing a similar type of cable gripping structure. U.S. Pat. No. 899,776 discloses a trolley wire splicer employing a number of jaws. This arrangement is somewhat similar to that disclosed in the U.S. Pat. No. 3,852,850 patent discussed above.

The present inventors recognize a need for a low cost simplified locking device for securing a rod or cable thereto employing segments without the need for an additional separate element to hold the segments together.

SUMMARY OF THE INVENTION

A device for locking an elongated cylinder thereto comprises a housing having a longitudinally extending bore therethrough for receiving the cylinder, the bore having a tapered portion forming a frustro-conical surface of revolution having a distal end and a relatively wider proximal end. A first element in the bore comprises a hollow frustro-conical segment axially extending between a first smaller diameter and a second larger diameter at respective opposing ends. The element has an external surface dimensioned to be received in a first direction and axially wedged in the bore tapered portion with the first end adjacent to and facing the distal bore end. The element has opposing shoulders axially extending between the first and second ends, a first projection upstanding a given axial extent from one of the shoulders at a given axial location and a recess is in the other of the shoulders at the given axial location of at least the given axial extent.

A second element in the bore and which may be identical to the first element is dimensioned to form a segmented tapered frustro-conical arrangement with the projections and recesses in interengaged relation wherein the projection of one element is received in the recess of the other element. The arrangement has a hollow core for receiving the cylinder therethrough.

Spring means are in the bore for urging the elements in the first direction against the surface for causing the elements to grip and lock the cylinder in response to the cylinder being displaced through the bore in the first direction and release the cylinder in response to the cylinder being displaced in a direction opposite the first direction.

In accordance with a preferred embodiment, the elements comprise sheet metal which is formed from a flat sheet by stamping. This provides a relatively simple low cost locking arrangement without the need for additional segment retaining means.

IN THE DRAWING

FIG. 1 is a side elevation sectional view of a device in accordance with one embodiment of the present invention;

FIG. 2 is an enlarged more detailed sectional elevational view of the device of FIG. 1 taken along lines 2—2.

FIG. 3a is an isometric view of one of the representative segments of the device of FIG. 2 according to one embodiment of the present invention;

FIG. 3b is an isometric view of a representative segment of the member of FIG. 2 according to a second embodiment of the present invention;

DESCRIPTION OF THE PREFERRED EMBODIMENTS

Figure 4:
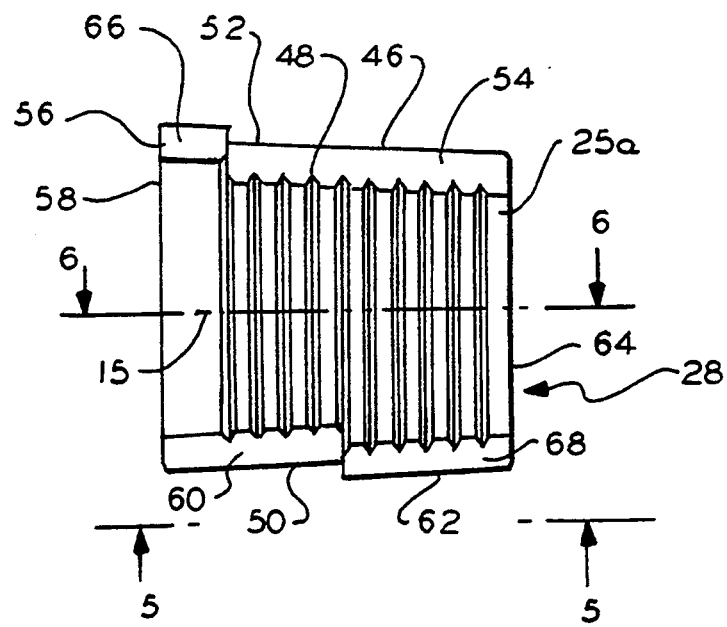
FIG. 4 is a plan view of one of the segments of the device employed in the embodiment of FIG. 1.

In FIG. 1, device 10 comprises a steel casing 12 having a longitudinal bore 14 on axis 15. Bore 14 has a circular cylindrical portion 16 and a tapered conical portion 18 which is formed as a frustro-conical surface of revolution. Portion 18 has a frustro-conical surface 20 which has a larger diameter 22 which extends from portion 16 and tapers to a narrower diameter 24 at an end thereof distal the portion 16. Bore 14 includes a circular cylindrical surface 27 of about the same diameter as diameter 24 and open at the casing 12 end 13. Bore 14 is thus open to the ambient at both ends.

A frustro-conical gripping arrangement comprising a pair of identical cable or bolt rod gripping segments 26 and 28 is in portion 18 and abuts the frustro-conical surface 20 between cylindrical portion 16 and cylindrical surface 27. Segments 26 and 28 form a combined frustro-conical segment bore 25, FIG. 2. The segments 26 and 28 have an axial extent along axis 15 of about one half the axial extent of surface 20. A coiled compression spring 30 is in bore 14 between the gripping segments 26 and 28 and swaged end 31 of the casing 12 and urges segments 26 and 28 opposite direction 43 toward end 13.

The end 31 of bore 14 is swaged to a reduced diameter relative to bore 14 at this end to lock the spring 30 in the bore 14 after the segments 26 and 28 and spring 30 are inserted in the bore 14. The swaged end 31 reduced diameter of bore 14 precludes removing the spring 30 and the segments 26 and 28 from the bore 14.

A steel bolt rod 32 has a free end 33 which extends through the bore 14 to the left of the drawing. The other end 34 has a flag 36 forced in interference fit thereto over serrations 37 on rod 32. A plurality of annular grooves 45 are formed in rod 32 to enhance gripping by segments 26 and 28. The flag 36 is a metal head which when attached to the rod 32 end 34 is locked to the rod and cannot be easily removed therefrom. The flag 36 is larger than the bore 14 so it cannot pass through the bore 14. A hasp arrangement comprises two hasps 40 and 42 with an aperture 44. The aperture 44 closely receives the rod 32 therethrough but cannot pass the flag 36 or the casing 12 therethrough.

The rod free end 33 is passed through the aperture 44 of the hasps 40 and 42 and then slid through the bore 14 of the casing 12 in direction 43. The rod 32 is also passed through the bore 25 formed by segments 26 and 28, through the core of the spring 30 and then through the opposite end of the casing 12 through the opening at the end 31. While a rod 32 is shown, in the alternative, steel cables, ropes and other elongated cylindrical structures may be used with the device 10. Preferably the rod is a circular cylinder.

The segments 26 and 28 are identical and therefore only segment 28 will be described. Representative gripping segment 28 preferably comprises a stamped sheet metal element which is circular in transverse section. The segment 28 is formed from stamped flat sheet metal. The segment may be formed of other materials such as sintered molded metal or thermoplastics in accordance with a given implementation.

The segment 28 is one half of a frustro-conical segment in which external surface 46 and internal bore segment surface 25a are both preferably tapered at the same angle. The taper angle of the internal surface 25a is not as important as the external surface 46 taper angle, the latter mating with the taper of the bore portion 18 of the casing 12, FIG. 1, for wedging thereagainst as will be explained. The bore surface 25a has an array of grooves 48 which extend about axis 15. The two bore surfaces 25a of the segments 26 and 28 form the combined frustro-conical bore 25, FIG. 2.

Figure 6:
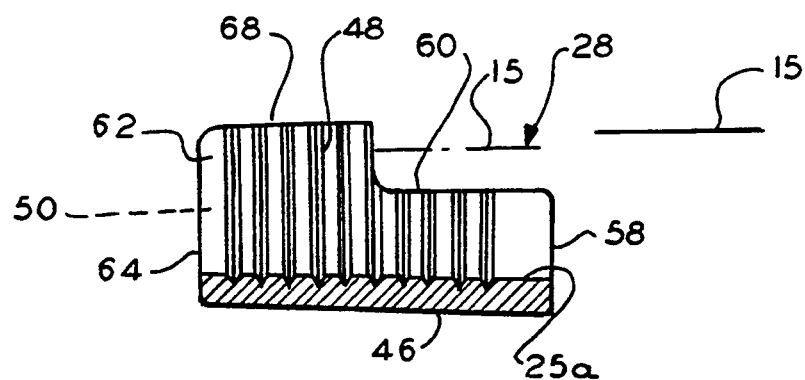
FIG. 6 is a sectional view of the segment of FIG. 4 taken along lines 6—6.

The segment 28 has opposing sides 50 and 52. The longitudinal edge of side 52 has a shoulder 54 which is recessed relative to upstanding projection 56 at end 58 of segment 28, Shoulder 54 has an axial extent along axis 15 greater than than the axial extent of projection 56, which is about one fourth the axial extent of shoulder 54 in this embodiment. The longitudinal edge of side 50 has an axial extending shoulder 60 which is recessed relative to upstanding projection 62, the shoulder 60 extending from end 58 to about midway along the side 50. The projection 62 extends from shoulder 60 to the other opposite end 64 of segment 28. The upper surface 66 of projection 56 and upper surface 68 of projection 62 lie in a plane. The axial extent of projection 62 is about one half the axial extent of the segment 28 along axis 15. The segment 28 is of uniform thickness. As seen in FIG. 6, the external surface 46 and the internal bore surface 25a taper at the same angle relative to axis 15.

Figure 5:
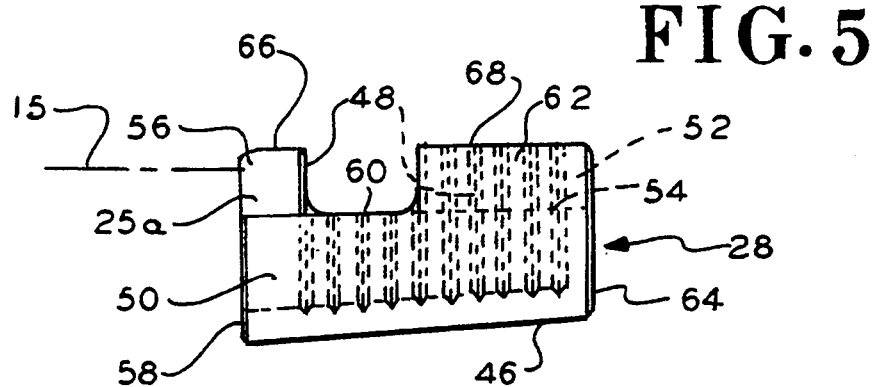
FIG. 5 is a side elevation view of the segment of FIG. 4.

The projections 56 and 62 of the other segment 26, being identical to segment 28, interengage therewith in interlocking relation in the mating recesses formed by shoulders 60 and 54, respectively, relative to direction 43, FIG. 1, along axis 15. That is, segment 26 projection 56 prevents forward displacement in direction 43 of segment 28 projection 62 beyond the location of projection 56. Similarly, projection 56 of segment 28 on the other side of the gripping arrangement prevents forward displacement of projection 62 of segment 26 beyond the location of projection 56 of segment 28. The upper surfaces 66 and 68 of projections 56 and 62 of each of the segments respectively extend beyond the plane defined by axis 15 (normal to the plane of the drawing in FIG. 1) to insure this interlocking engagement as shown in FIGS. 5 and 6.

In FIG. 1, the segments 26 and 28 are located in the non-clamping position. In this position the combined bore 25 of the two segments is larger than the outer diameter of rod 32. This is also true for the bore 25 at the smaller diameter end of the segments to the right in FIG. 1. However, due to the taper of the surface 20, as the rod 32 displaces to the right in FIG. 1, the spring 30 urges the segments to the right causing the grooves 48 to grip the rod and causing the segments to be pulled with the rod as the housing 12 is displaced relative to the rod 32 in direction 43. This action displaces the segments toward the smaller diameter of surface 20 to the right in FIG. 1. A position is reached where the segments are forced radially together such that the bore 25 could be smaller than the diameter of rod 32. At this location the segments are wedged against the rod at grooves 45 by the bore 14 in somewhat interference fit preventing further relative displacement of the casing 12 with respect to the rod 32 in direction 43. The tapered smaller diameter end of the bore 25 is the region which grips the rod due to the tapering of the bore 25.

Because of the interlocking engagement of the projections, both segments 26 and 28 move generally in unison axially not withstanding the clearance spacing 63, FIG. 1, between adjacent projections 62 on one segment and projection 56 on the other segment. This spacing 63 is illustrated as about one fifth the length of the segment but may be less in other embodiments. Spacing 63 allows one of the segments 26 and 28 to displace axially without displacing the other segment. This is important to preclude picking the seal with a small diameter wire or pin. In certain cables that may be used with the device 10, the cable diameters may vary from cable to cable by a relatively large amount, e.g., 0.012 inches. This provides a clearance for a pin to be inserted in the bore 14 between the cable and casing 12. The pin is used to displace one of the segments 26 and 28 in order to release the gripping action. By providing clearance 63, only one segment is displaced, the other remaining in place retaining its gripping action. There is insufficient clearance for a second pick to be inserted. The spring 30 provides resilient resistance to such displacement also adding to the difficulty in displacing the segments in a direction to release their grip on the cable. This is not a problem with the rod 32 because the rod can be provided to tight dimensional tolerances, e.g., 0.001 inches.

The interlocking engagement ensures that one of the segments does not displace significantly axially out of position an amount sufficient to defeat the clamping action of that segment. For example, without the interlocking action of the projections, segment 28 might otherwise remain in the position shown whereas the segment 26 might in the clamping position be located at the other end of the tapered surface 20 adjacent to surface 27. Thus only one half the clamping action might occur since one of the segments would not be in the clamp position.

In FIG. 3b, an alternative embodiment is illustrated comprising a pair of identical segments 70, only one of which is shown. This is similar to the arrangement disclosed in the aforementioned copending application. Segment 70 has a plurality, four in this embodiment, of cantilevered fingers 72 which form bore surface 25a. The fingers are cantilevered from end portion 74 of the segment 70 along axis 76. The segment 70 at the extended end 78 defines a smaller diameter than the end 80 at portion 52. The segment 70 is frustro-conical and mates with and engages the frustro-conical surface 20 of the bore 14 of casing 12. Two fingers, however, are preferred because of ease of manufacturing.

Each of the fingers 72 has an array of parallel curved grooves 82. The two segments 70 of a device and the fingers 72 are in an annular array. Both the external and internal surfaces taper relative to the longitudinal axis 76 of the segment 70 and are both frustro-conical. The remaining relationships of the various portions of the segment 70 is identical to the segment 28 described above. The fingers 72 are radially resilient and can bend radially inwardly toward axis 76 in response to an inwardly directed force on the external surface thereof. This accommodates differences in diameters of the rod 32 to that of bore 25 at the smaller tapered end of the segments 70.

The larger end 58 of the segments 26 and 28 has a sufficiently large external diameter so that the spring 30 abuts thereagainst in the assembled state, FIG. 1. The spring 30 normally urges the narrow tapered end 64 of the segments in wedging relationship with the tapered portion 20 of the casing 12 bore 14.

In operation, the rod free end 33 is inserted through the bore 14 of casing 12 and through the bore 25 of the segments 26 and 28, direction 43. Only the ends 64 of the segments engage the rod due to the taper of the surfaces 25a. As the rod is displaced to the left in the drawing in direction 43 relative to the segments 26 and 28, the segments 26 and 28 are displaced in direction 43 in unison by their gripping action with the rod 32 and their interengaged relation. The segments are permitted by the larger diameter of bore 14 at this location to displace radially apart to permit the rod to pass therethrough.

However, should the rod 32 be displaced in the opposite direction relative to the casing 12, the spring 30 urges the segments in this direction and the ridges of segments 26 and 28 formed by grooves 48 grip the rod 32 external surface causing the segments 26 and 28 to also be pulled with the rod. This pulling action by the rod forces the segments 26 and 28 to wedge into the tapered portion 20 of the casing 12 bore 14 against the rod 32. The interlocking action of the segments ensures that both segments are pulled together. Otherwise, due to their loose fit with the rod in the position of FIG. 1, possibly only one segment may be displaced. The greater the pulling force that is exerted, the greater the wedging action of the segments 26 and 28 in the bore 14. Thus, once the casing 12 is slipped onto the rod 32 and assembled to a given location relative to each other, the casing 12 cannot be removed from the rod in the direction 43 because of the wedging action.

The rod 32 is securely locked to the hasps 40 and 42, since the flag 36 and the casing 12 are both larger than the aperture 44 of the hasps. The only way to remove the rod 32 is to cut it at an appropriate location preferably between the flag 36 and the hasps. Once the flag 36 is removed, the rod 32 at end 34 is free of the flag 36 and can be slid through the device 10 in the relative direction 43. Once the rod is removed, a new flag and rod assembly can be attached to the device 10 for reuse.

While particular embodiments of the present invention have been described, it should be understood that it is intended that such embodiments not be limiting, that modifications may be made to the disclosed embodi-

What is claimed is:

1. A device for locking a cylinder thereto comprising:

a housing having a longitudinally extending bore therethrough for receiving said cylinder, said bore having a tapered portion forming a frustro-conical surface of revolution having a distal end and a relatively wider proximal end;

a first element comprising a hollow frustro-conical segment axially extending between a first smaller diameter and a second larger diameter at respective opposing ends, said element having an external surface dimensioned to be received in a first direction and axially wedged in said bore tapered portion with said first end adjacent to and facing said distal bore end, said element having opposing shoulders axially extending between said first and second ends, a first projection upstanding a given axial extent from one of said shoulders at a given axial location and a recess in the other of said shoulders at said given axial location of at least said given axial extent;

a second element which is identical to the first element is dimensioned to form a segmented tapered frustro-conical arrangement with the projections and recesses in interengaged relation wherein the projection of one element is received in the recess of the other element, said arrangement having a hollow core for receiving said cylinder therethrough; and spring means in said bore for urging the elements in said first direction against said surface for causing the elements to grip and lock the cylinder in response to the cylinder being pulled through said bore in the first direction and release the cylinder in response to the cylinder being pulled in a direction opposite the first direction relative to said housing.

2. The device of claim 1 wherein said elements comprise stamped sheet metal.

3. The device of claim 1 wherein the elements each include at least one slot axially extending from said first end forming said first end into a plurality of radially resilient fingers.

4. The device of claim 1 wherein the elements each have a projection upstanding from each of said shoulders, said recess being formed in each of said shoulders, said recess being arranged to receive the projection of the other element.

5. The device of claim 4 wherein said projections on the shoulders of an element are of different axial extents.

6. A device for locking an elongated cylinder thereto comprising:

a housing having a longitudinally extending bore for receiving said cylinder therethrough, said bore having a tapered surface portion;

a segmented hollow frustro-conical cylinder clamp member comprising a plurality of separate spaced elements of similar construction dimensioned to mate with and be received in said tapered portion in a first direction toward said surface for wedging against said surface in response to axial displacement in said first direction, a first of said elements comprising a hollow frustro-conical segment axially extending between a first smaller diameter and a second larger diameter at respective opposing ends, said first element having opposing shoulders axially extending between said opposing ends, a first projection upstanding a given axial extent from one of said shoulders at a given axial location and a recess in the other of said shoulders at said given axial location of at least said given axial extent;

a second of said plurality of elements dimensioned to form said segmented clamp member with said first element with the projections and recesses of the first and second elements in interengaged relation wherein the projection of one element is received in the recess of the other element, said member having a hollow core for receiving said cylinder therethrough; and a spring in said bore for urging the elements of said member in said first direction against said surface for causing the elements to grip and lock the cylinder in response to the cylinder being displaced through said bore in the first direction and for releasing the cylinder in response to the cylinder displacement in a direction opposite the first direction.

7. The device of claim 6 wherein the member is stamped sheet metal formed from a flat sheet material.

8. The device of claim 6 wherein the housing is steel.

9. The device of claim 6 wherein said elements are each approximately one half of a right circular frustro-cone.

10. The device of claim 6 wherein the elements are formed with a plurality of cantilevered radially resilient fingers at said smaller ends.

11. The device of claim 6 wherein the projection has an axial extent of at least about one half the axial extent of that element, said recess having an axially extent of greater than half the axial extent of that element wherein the projection of one element and the recess of the other element interengaged therewith are related so that one element may not substantially axial displace relative to the other element.

12. The device of claim 6 wherein the interengagement of the projections and recesses of the elements is such that axial displacement of one element causes axial displacement of the other element.

13. The device of claim 6 wherein said cylinder is steel of circular cross section.

* * * * *